(12) United States Patent
Sugiyama

(10) Patent No.: US 10,103,809 B2
(45) Date of Patent: Oct. 16, 2018

(54) WAVELENGTH TUNABLE LIGHT SOURCE, AND OPTICAL TRANSCEIVER USING THE SAME

(71) Applicant: Fujitsu Optical Components Limited, Kawasaki-shi, Kanagawa (JP)

(72) Inventor: Masaki Sugiyama, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 15/822,673

(22) Filed: Nov. 27, 2017

(65) Prior Publication Data

US 2018/0183517 A1    Jun. 28, 2018

(30) Foreign Application Priority Data

Dec. 28, 2016 (JP) ................. 2016-256774

(51) Int. Cl.
*H04B 10/572* (2013.01)
*H04B 10/079* (2013.01)
*G02B 6/12* (2006.01)

(52) U.S. Cl.
CPC ... *H04B 10/07957* (2013.01); *G02B 6/12007* (2013.01); *G02B 6/12009* (2013.01); *H04B 10/572* (2013.01)

(58) Field of Classification Search
CPC .................................................. H04B 10/572
See application file for complete search history.

(56) References Cited

U.S. PATENT DOCUMENTS

| | | | |
|---|---|---|---|
| 2002/0041414 A1* | 4/2002 | Oguma | H04B 10/07957 398/87 |
| 2004/0120635 A1* | 6/2004 | Juan | H04B 10/572 385/15 |
| 2011/0122906 A1* | 5/2011 | Seeley | G01J 9/0246 372/38.07 |
| 2015/0085292 A1 | 3/2015 | Uesaka et al. | |

FOREIGN PATENT DOCUMENTS

WO      2016/010528 A1    1/2016

\* cited by examiner

*Primary Examiner* — Shi K Li
(74) *Attorney, Agent, or Firm* — Staas & Halsey LLP

(57) ABSTRACT

A wavelength tunable light source includes a light source, a wavelength monitor circuit configured to receive light emitted from the light source, and a processor that controls the light source based upon an output value of the wavelength monitor circuit, wherein the wavelength monitor circuit has a wavelength filter with a periodic transmission spectrum, and three photo detectors connected to outputs of the wavelength filter, and wherein the processor is configured to calculate a ratio of photo-detection normalized with two of three quantities of light received at the three photo detectors and control electric current input to the light source such that a calculated ratio of photo-detection approaches a target ratio at a designated wavelength.

8 Claims, 8 Drawing Sheets

| WAVELENGTH | RATIO ID | TARGET VALUE OF RATIO |
|---|---|---|
| $\lambda_1$ | A | $R_T 1$ |
| $\lambda_2$ | C | $R_T 2$ |
| ⋮ | ⋮ | ⋮ |
| $\lambda_k$ | B | $R_T 3$ |
| ⋮ | ⋮ | ⋮ |
| $\lambda_n$ | C | $R_T n$ |

WAVELENGTH TUNABLE LIGHT SOURCE, AND OPTICAL TRANSCEIVER USING THE SAME

CROSS-REFERENCE TO RELATED APPLICATIONS

This application is based upon and claims priority to earlier filed Japanese Patent Application No. 2016-256774 filed Dec. 28, 2016, which is incorporated herein by reference in its entirety.

FIELD

The present invention relates to a wavelength tunable light source for use in optical communications networks and an optical transceiver using the wavelength tunable light source.

BACKGROUND

To achieve high-capacity fiber optic communications, wavelength division multiplexing (WDM) technology is being adopted. In WDM, a tunable light source (TLS) capable of emission at different wavelengths is used. A wavelength monitor circuit is provided in a tunable light source to control the wavelength. In general, a wavelength monitor circuit is implemented by combination of a wavelength or spectral filter having a periodic transmission spectrum and a photodiode (PD). A delay interferometer is used as such a wavelength filter. See, for example, U.S. patent application publication No. 2015/0085292 A1 and International Publication No. WO 2016/010528.

FIG. 1 illustrates a configuration of a conventional tunable light source. By having a light beam output from a semiconductor optical amplifier (indicated as "SOA1") bounce between a resonator filter and the SOA1, light with a specific wavelength is amplified selectively. A portion of the amplified light is taken out from tap-1 and branched into two at tap-2. One of the branched light components is input to a wavelength filter, and the other is amplified by and output from another semiconductor optical amplifier (indicated as "SOA2"). A portion of the output light is received by a power monitoring photodiode "PDm". The wavelength filter has a 3 dB coupler, a 90-degree hybrid coupler, and two waveguides extending at different lengths between the 3 dB coupler and the 90-degree hybrid coupler. Two light components output from the 90-degree hybrid coupler, with optical phases offset by 90 degrees from each other, are received at PD1 and PD2, respectively.

Photocurrents detected by the PD1 and the PD2 of the wavelength monitor circuit are denoted as P1 and P2, respectively, and photocurrent detected by the power monitoring photodiode "PDm" is denoted as $P_{mon}$. FIG. 2 illustrates spectra of two current ratios (i.e., transmission spectra of the wavelength filter) as a function of wavelength. The current ratio of P1 to $P_{mon}$ (P1/$P_{mon}$) is indicated by a solid curve and the current ratio of P2 to $P_{mon}$ (P2/$P_{mon}$) is indicated by a dashed curve. In order to precisely control the wavelength so as to be consistent with the respective wavelength gridlines, it is preferable for the filtering spectrum to have a greater slope. The greater the slope, the more sensitive the wavelength control with more derivative gain. At each wavelength gridline, whichever of the P1 and the P2 with a greater slope is selected, and the wavelength is controlled so as to bring the photocurrent of PD1 or PD2 to be the target value.

With the configuration of FIG. 1, the wavelength monitor circuit cannot achieve satisfactory accuracy because the intensity of light received at the power monitor "PDm" fluctuates depending on the state of the semiconductor optical amplifier "SOA2". Another known structure of wavelength monitor circuit is illustrated in FIG. 3. A portion of light guided to the wavelength monitor circuit is branched at tap-3, and received by an additional photodiode PDmW for wavelength monitoring. The light received at PDmW is used as reference light.

In the configuration of FIG. 3, the additional tap-3 is provided and the quantity of light received at PD1 and PD2 is reduced. If the split ratio (or coupling ratio) of tap-2 is adjusted so as to allocate adequate light to the wavelength monitoring site, the intensity of light output from the SOA2 will decrease. Besides, the coupling ratio of tap-3 depends on the wavelength. In order for acquiring a quantity of light needed for the wavelength monitoring photodiode PDmW, the coupling ratio of tap-3 is determined on the basis of the wavelength resulting in the smallest proportion of light supplied to PDmW. This is because, for the wavelength resulting in the largest proportion of light supplied to the PDmW, the quantity of light received at PD1 and PD2 decreases, and therefore, the coupling ratio at tap-2 toward the wavelength filter needs to be increased. In this case, the power of light output from the light source decreases due to the increased optical loss. In addition, because the coupling ratio of tap-3 depends on the wavelength, another problem arises such that the controlled wavelength itself may shift and that the wavelength filter becomes unstable.

There is a demand for a wavelength tunable light source using a wavelength monitor with stable operation and less optical loss.

SUMMARY

According to an aspect of the invention, a wavelength tunable light source has a light source, a wavelength monitor circuit configured to receive light emitted from the light source, and a processor that controls the light source based upon an output value of the wavelength monitor circuit, wherein the wavelength monitor circuit has a wavelength filter with a periodic transmission spectrum, and three photo detectors connected to outputs of the wavelength filter, and wherein the processor is configured to calculate a ratio of photo-detection normalized with two of three quantities of light received at the three photo detectors and control electric current input to the light source such that a calculated ratio of photo-detection approaches a target value of ratio at a designated wavelength.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

DESCRIPTION OF EMBODIMENTS

Figure 1:
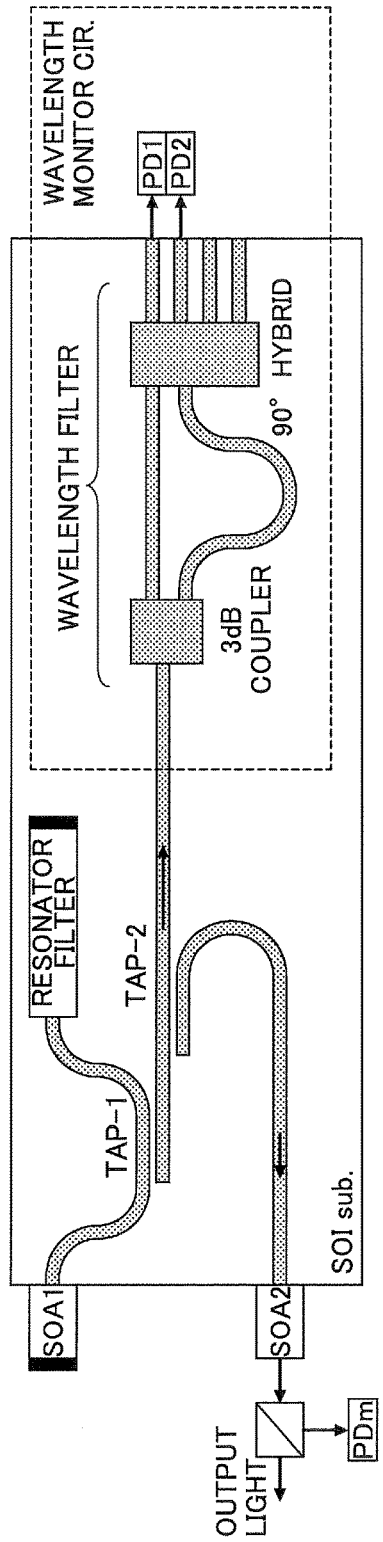
FIG. 1 illustrates a conventional wavelength monitor circuit.
Figure 2:
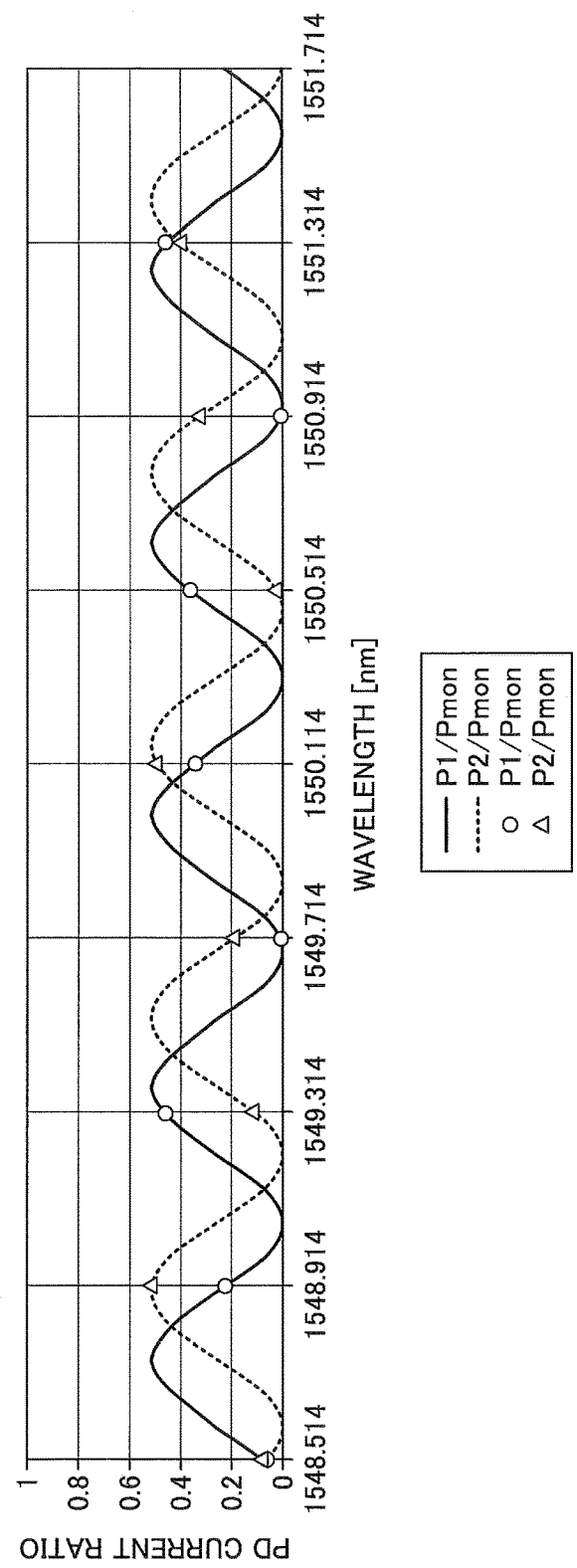
FIG. 2 illustrates spectra of the current ratios of two photodiodes over the output of the power monitoring diode (PDm)
Figure 3:
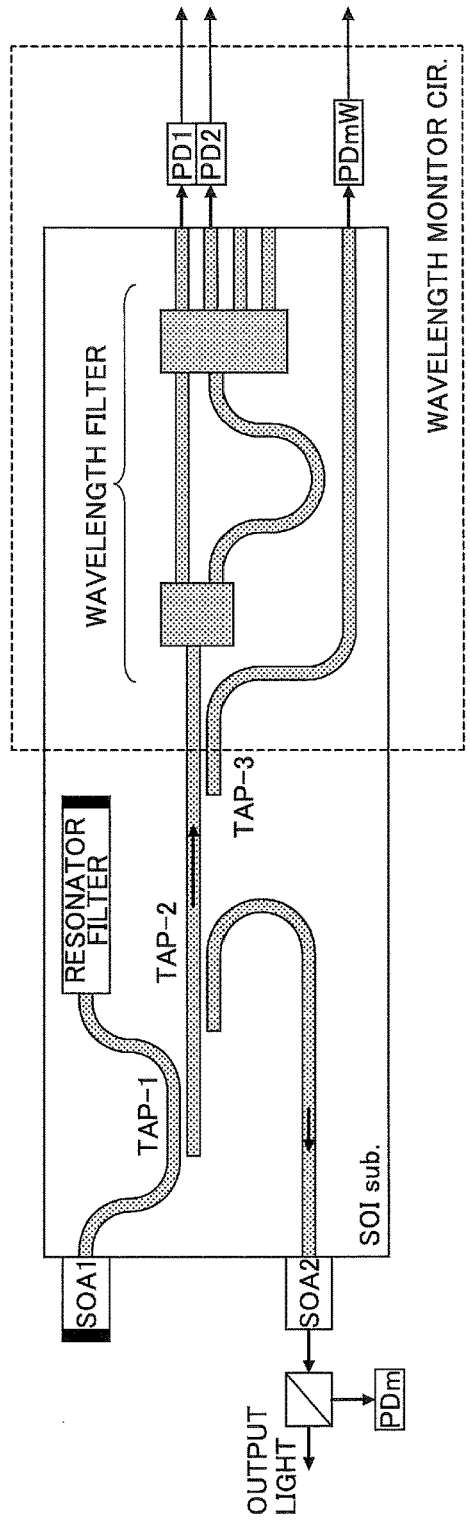
FIG. 3 illustrates another known structure of a wavelength monitor circuit.
Figure 4:
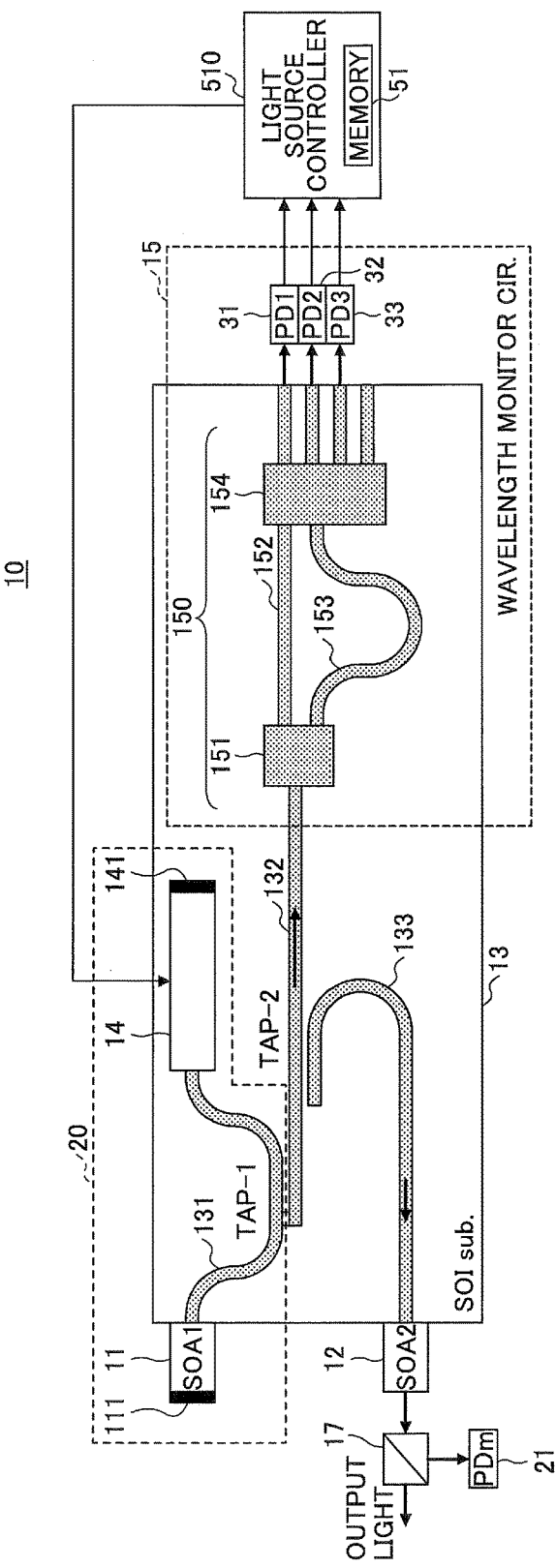
FIG. 4 is a schematic diagram of a wavelength tunable light source with a wavelength monitor circuit according to an embodiment.

FIG. 4 is a schematic diagram of a wavelength tunable light source 10 according to an embodiment. The wavelength tunable light source 10 has a light source 20, a wavelength monitor circuit 15, and a light source controller 510. The wavelength monitor circuit 15 has a wavelength filter 150 and three photo detectors 31 (indicated as "PD1"), 32 (indicated as "PD2") and 33 (indicated as "PD3").

The light source 20 has a semiconductor optical amplifier 11 ("SOA1"), a resonator filter 14, and an optical waveguide 131 extending between them. A high-reflector (HR) coating 111 is formed on one end face of the semiconductor optical amplifier 11, opposite to the other end face coupled to the optical waveguide 131. A mirror or a reflector 141 is formed at the end face of the resonator filter 14 on the opposite side from the optical waveguide 131. The resonator filter 14 serves as an external resonator. Light of a specific wavelength is amplified by being bounced back and forth between the HR coating 111 and the reflector 141, and coupled to the optical waveguide 132 at the tap-1. The resonator filter 14 is, for example, a ring filter in which one or more ring waveguides are arranged, and the resonant frequency is determined by the circumferential length of the ring, the index of refraction of the waveguide, and so on.

A portion of the light travelling through the optical waveguide 132 is branched into the optical waveguide 133 at the tap-2, and amplified by the semiconductor optical amplifier 12 ("SOA2"). The amplified light is split by the beam splitter 17, and a part of light (e.g., a reflected light component) is detected by the power monitor (PDm) 21. The detection result is used at the light source controller 510 to perform feedback control on the SOA2. (The connection line is omitted for the sake of simplification of the figure.) The light transmitted through the beam splitter 17 is output light of the wavelength tunable light source 10.

The light that continues to propagate through the optical waveguide 132 from the tap-2 becomes input light to the wavelength filter 150. The wavelength filter 150 includes an optical splitter 151 for splitting the input light into two, optical waveguides 152 and 153 extending from the optical splitter 151 at different lengths, and an optical mixer 154. At the optical mixer 154, the light beams incident from the optical waveguides 152 and 153 interfere with each other, light components whose phases are shifted by 90 degrees from each other are output. The optical splitter 151 is, for example, a 3 dB coupler that equally divides the input light and output the divided light components attenuated by 3 dB in the forward direction. The optical mixer 154 is a 90-degree hybrid with four output waveguides, and three of the four output waveguides are connected to inputs of the photo detectors 31 ("PD1"), 32 ("PD2"), and 33 ("PD3").

With this configuration, it is unnecessary to provide an additional tap or a branching section before the wavelength filter 150, and optical loss of the light input to the wavelength filter 150 can be reduced. The resonator filter 14, the optical waveguides 131, 132 and 133, and the wavelength filter 150 are monolithically formed over a substrate (such as SOI) 13, and a compact structure can be achieved without increasing the number of taps.

Three light components output from the optical mixer 154 are received at the photo detectors 31 ("PD1"), 32 ("PD2"), and 33 ("PD3"), respectively. The quantities of the photocurrents detected by the photo detectors 31, 32, and 33 are supplied to the light source controller 510 and used for wavelength control. A circuit such as a transimpedance amplifier (TIA) or the like for converting a photocurrent to an electric voltage is omitted because it is not directly related to the invention.

In the embodiment, normalization is performed using the sum of two quantities of the received light out of the three detected quantities as a denominator. To be more precise, the photocurrents detected by the photo detectors 31, 32, and 33 are denoted as P1, P2, and P3, respectively. Three or more ratios are calculated such that each ratio is expressed by any one of the three quantities over (i.e., divided by) the sum of any combination of two quantities of the three. Then, the ratio with the greatest slope at the designated wavelength is selected. For example, P1/(P1+P2), P2/(P1+P3), P3/(P2+P1), and so on are calculated by normalizing the detected current values using the sum of any two quantities of the received lights as a denominator.

In the conventional configuration, normalization is performed using a monitor light that does not pass through a wavelength filter (namely, without periodic change). In contrast, in the embodiment, normalization is carried out with a periodically changing quantity of received light, having passed through the wavelength filter 150, as a denominator. When the quantity of light received at a single photo detector (or PD) is used for normalization, the denominator may become zero depending on the wavelength. To avoid this, the sum of the quantities of light received at two photo detectors (PDs) is used as a divisor (or denominator).

Besides, when only two ratios are used as in the conventional technique, there may be a wavelength at which the spectra of both ratios become the local minimum or the local maximum. Near the local maximum or the local minimum, the slope of the spectrum approaches zero, and an adequate intensity change with respect to wavelength cannot be acquired (entering a dead zone). At or near such a wavelength, the accuracy of wavelength control is degraded. Therefore, in the embodiment, three or more current ratios are calculated and the ratio with the greatest spectral slope (i.e., with the greatest change in intensity with respect to wavelength) is selected to ensure the accuracy of wavelength control.

With this configuration, even if the input light to the wavelength filter 150 (supplied from the tap-2) fluctuates, the ratio calculated from the photocurrents of the photo detectors 31 ("PD1"), 32 ("PD2"), and 33 ("PD3") does not vary and stable wavelength monitoring can be achieved. Furthermore, because the entirety of the light supplied from the tap-2 is used for calculation of the ratio (including normalization), optical loss can be reduced in monitoring the wavelength.

Figure 5:
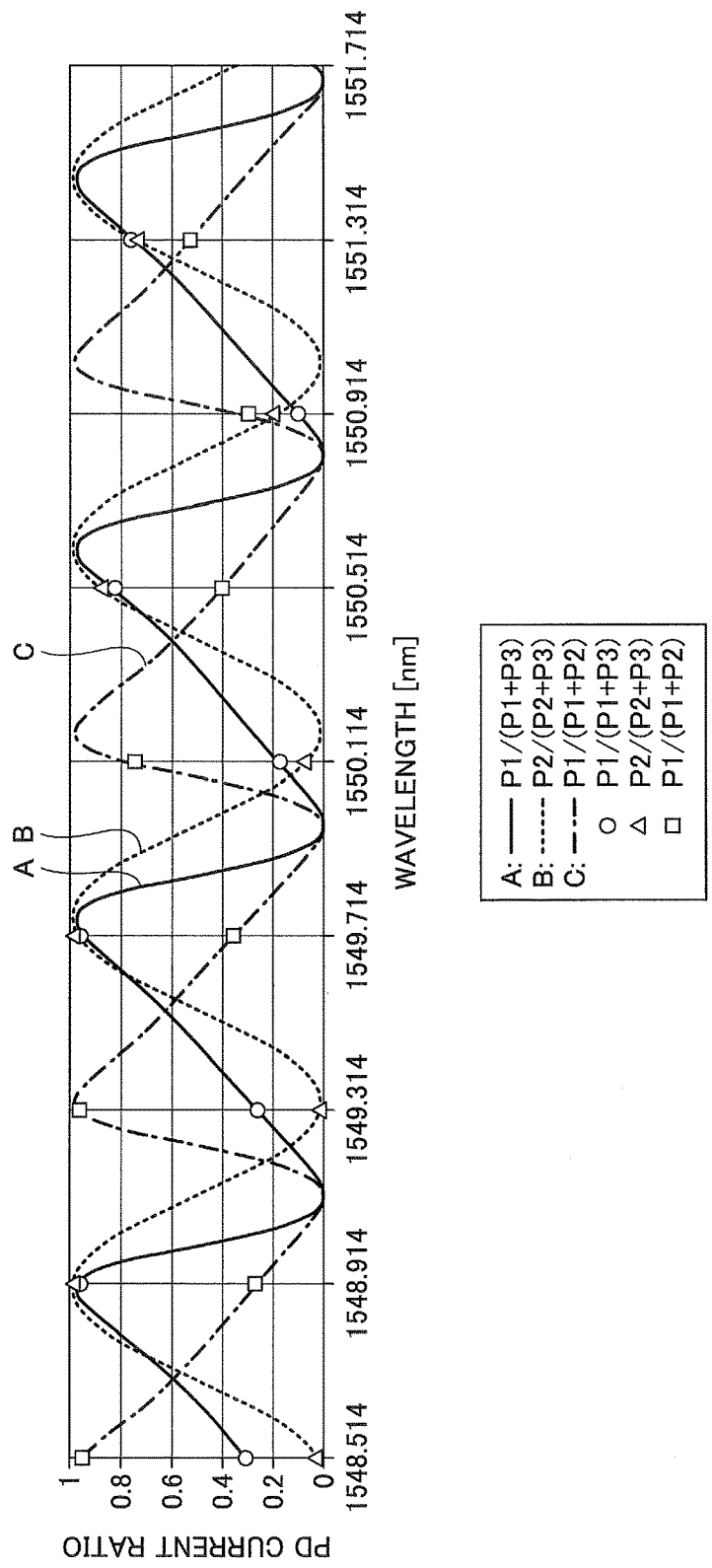
FIG. 5 illustrates transmission spectra of the wavelength filter of the embodiment calculated from photocurrents output from three PDs.

FIG. 5 illustrates transmission spectra of the wavelength filter 150 of the embodiment using the ratios of the quantities of light received at the photo detectors 31, 32, and 33. In this example, three ratios P1/(P1+P3), P2/(P2+P3), and P1/(P1+P2) are employed. The grid in FIG. 5 is a fixed grid of 50 GHz spacing. At any wavelength, the slope(s) of one or more spectra of the three ratios are sufficiently large. The wavelength is adjusted using the periodically changing ratio with the greatest slope so as to bring the wavelength of the light source to be closer to the target wavelength.

For instance, at wavelength of 1549.314 nm, the spectral slope of P1/(P1+P3) is the greatest one among the three. The resonance wavelength of the resonator filter 14 is controlled such that the ratio determined by the photocurrents or electric voltage detected by the photo detector 31 ("PD1") and photo detector 33 ("PD3") approaches the target value 0.25 of the ratio at this wavelength.

At wavelength of 1549.714 nm, the spectral slope of P1/(P1+P2) is the greatest one among the three. The resonance wavelength of the resonator filter 14 is controlled such that the ratio determined by the photocurrents or electric voltages detected by the photo detector 31 ("PD1") and photo detector 32 ("PD2") approaches the target value 0.35 of the ratio at this wavelength.

The ratio based upon the photocurrent detected by the photo detectors 31, 32, and 33 is calculated by the light source controller 510. The light source controller 510 stores information about the three types of transmission spectra measured in advance (e.g., before shipment) in the memory 51. When the wavelength is designated for the actual operation (e.g., at the beginning of the service), the ratio with the greatest slope (or the gradient) at the designated wavelength is determined with reference to the memory 51. Then, the current ratio or the power ratio is calculated from the quantities of light monitored by the photo detectors 31, 32, and 33, and the resonance wavelength of the resonator filter 14 is controlled such that the calculated value approaches the target value of the ratio at the designated wavelength. The resonance wavelength of the resonator filter 14 can be controlled to a target value by, for example, adjusting the electric current applied to a heater provided near the resonator filter 14 and changing the refractive index of the resonator filter 14.

Figures 6, 7:
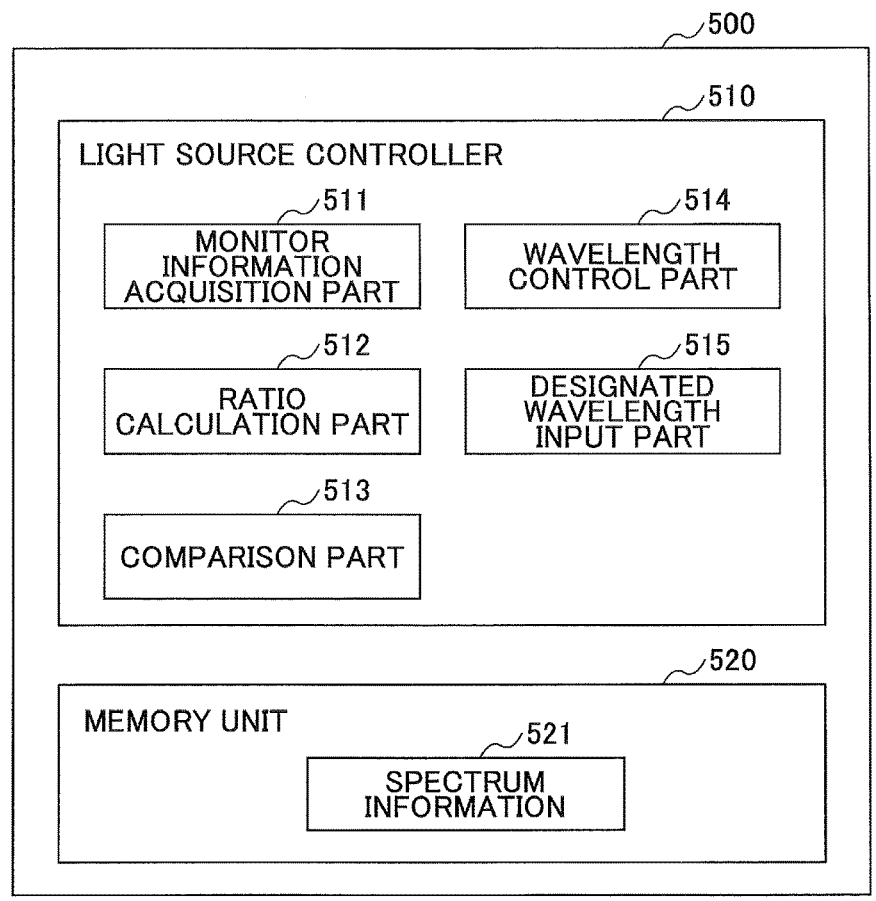
FIG. 6 is a functional block diagram of a light source controller.
FIG. 7 illustrates an example of a table in which current ratios and target values of the ratios are associated with each of wavelengths.

FIG. 6 is a functional block diagram of the light source controller 510. In this example, the light source controller 510 and a memory unit 520 are arranged in one chip of, for example, a microprocessor 500. The light source controller 510 includes a monitor information acquisition part 511, a ratio calculation part 512, a comparison part 513, a wavelength control part 514, and a designated wavelength input part 515.

When the wavelength to be used in the wavelength tunable light source 10 is input to the designated wavelength input part 515, the light source controller 510 refers to the spectrum information 521 saved in the memory unit 520 and determines the ratio for which the spectral slope becomes the greatest at the designated wavelength and the target value of the ratio at that wavelength.

The monitor information acquisition part 511 acquires light receiving (or photocurrent) quantities or associated electric values from the photo detectors 31, 32, and 33 of the wavelength monitor circuit 15. The ratio calculation part 512 calculates the selected ratio (for example, P1/(P1+P3)) using the acquired photocurrent values. The ratio is expressed as one of the three light receiving quantities over (or divided by) the sum of any two of the three light receiving quantities (with said one quantity as a numerator and the sum as a denominator). The comparison part 513 compares the calculated value of the ratio with the target value, and outputs the comparison result to the wavelength control part 514. The wavelength control part 514 controls the wavelength of the light source 20 according to the comparison result. For example, electric current applied to the heater of the resonator filter 14 of the light source 20 is adjusted to control the resonance wavelength.

The function of the light source controller 510 is realized by an arithmetic processing circuit of the microprocessor 500. The memory unit 520 may be realized by the memory 51 (FIG. 4) or additional or external memory. The memory unit 520 may store the spectrum information 521 in a form of the transmission characteristic information of the wavelength filter 150 illustrated in FIG. 5. Alternatively, it may save the spectrum information 521 in a form of a table 522 illustrated in FIG. 7. The memory 51 is not necessarily provided inside the microprocessor 500, but may be arranged outside the microprocessor 500.

FIG. 7 illustrates an example of the table 522 held in the memory unit 520. The table 522 describes the respective wavelengths, each wavelength being associated with a ratio ID representing the type of ratio to be calculated and the target ratio value Rt used for that ratio and the associated wavelength. The ratio IDs identify three or more ratios configured in advance. For example, among three ID items A, B, and C given to the respective spectra in FIG. 5, the ratio ID with the greatest spectral slope is associated with each of the wavelengths. Upon designation of the wavelength, the light source controller 510 may determine the type of ratio and the target value of that ratio, with reference to the transmission spectrum information of FIG. 5 or the table 522 of FIG. 7.

Figure 8:
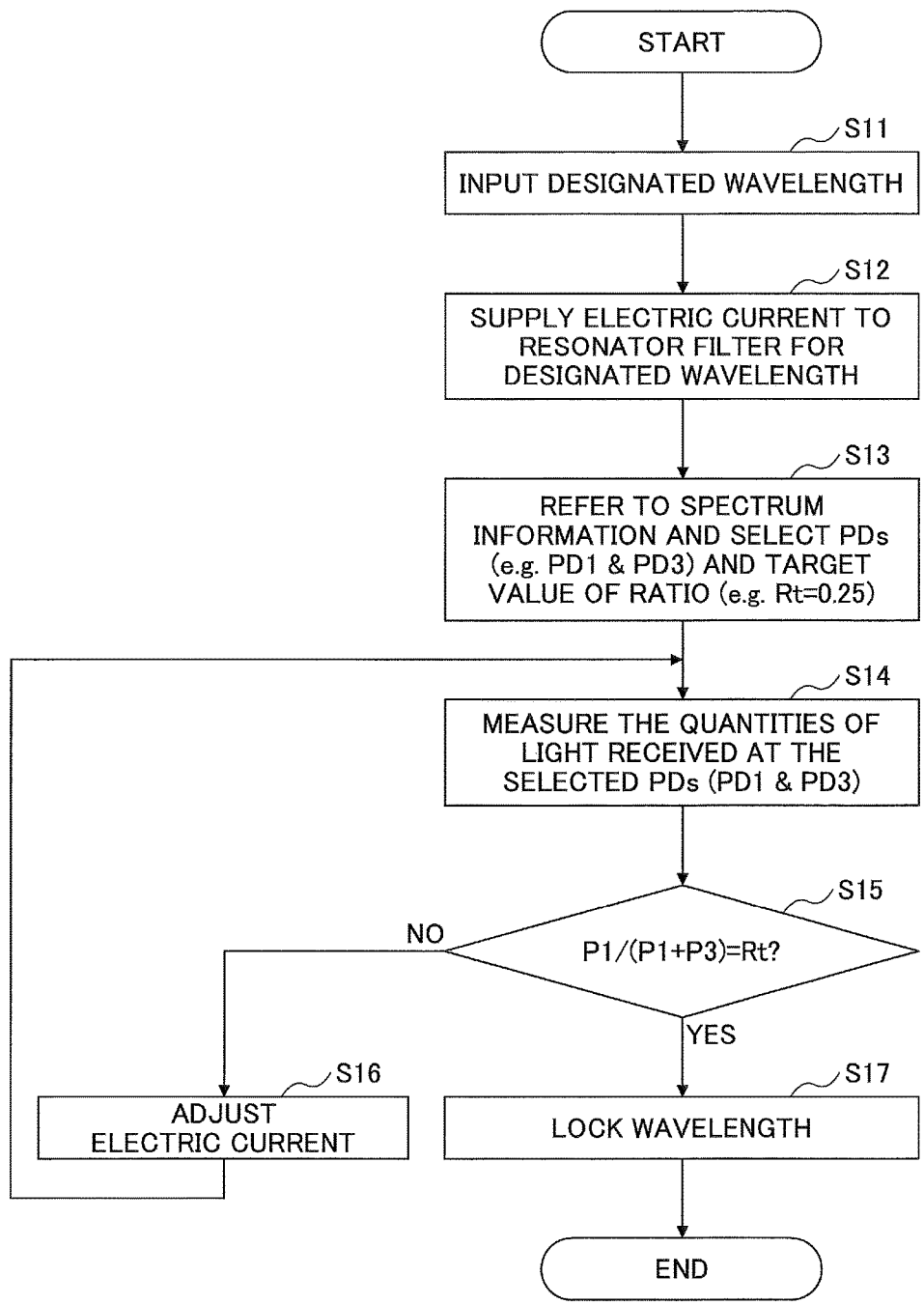
FIG. 8 is a flowchart of wavelength control performed by the light source controller.

FIG. 8 is a flowchart of wavelength control performed by the light source controller 510. Upon input of a designated wavelength (S11), electric current for achieving the designated wavelength is injected to the resonator filter 14 (S12). With reference to the spectrum information 521, photo detectors (PDs) to be used and the target value (Rt) of the ratio are selected for measurement or monitoring at the designated wavelength (S13).

For example, when a wavelength of 1549.314 nm is designated, a ratio P1/(P1+P3) with the greatest spectral slope at that wavelength is selected with reference to the spectrum of FIG. 5, and photo detectors 31 ("PD1") and 33 ("PD3") are selected. Also, the target value Rt of the ratio used at the designated wavelength is also specified. In this example, the target value equals 0.25 (Rt=0.25).

Quantities P1 and P3 of light received at the photo detectors 31 and the photo detector 33, respectively, are acquired (S14). Then, P1/(P1+P3) is calculated from the acquired light receiving quantities, and it is determined whether the calculated value of the ratio is the same (within a certain error range) as the target value Rt (S15).

If the calculated value of the ratio coincides with the target value Rt within the acceptable error range (YES in S15), the wavelength is locked (S17). In this case, the electric current applied in step S12 to the resonator filter 14 is maintained. When the calculated value of the ratio is different from the target value Rt (NO in S15), then the electric current input to the resonator filter 14 is adjusted (S16) and the steps S14 to S16 are repeated until the target wavelength is obtained. The direction of the current control can be determined by the sign (plus or minus) of the difference between the calculated value and the target value of the ratio. The step size for the current control may be set appropriately.

The above-described control process can achieve accurate wavelength control based upon stable wavelength monitoring with less optical loss.

Figure 9:
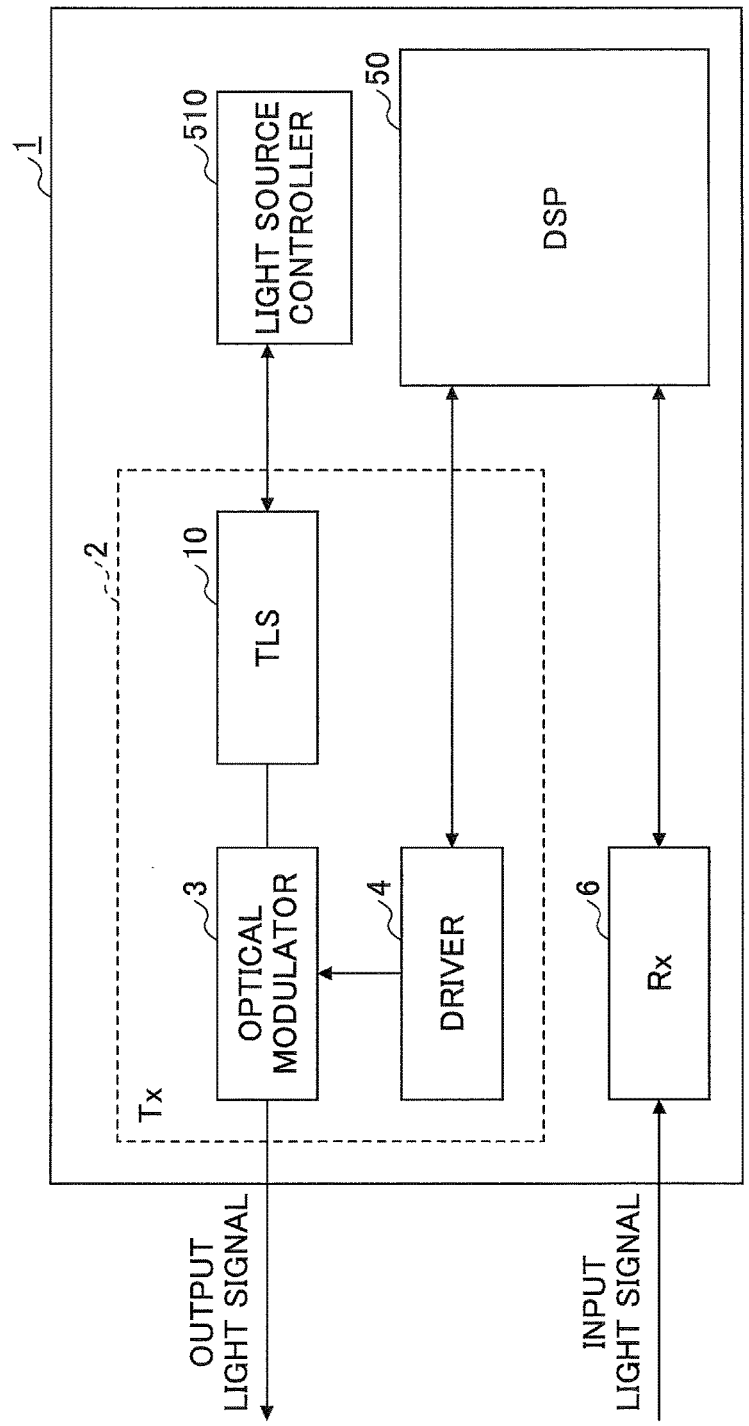
FIG. 9 is a schematic diagram of an optical transceiver using the wavelength tunable light source of the embodiment.

FIG. 9 is a schematic diagram of an optical transceiver 1 using a wavelength tunable light source 10 (labeled as "TLS" in the figure). The optical transceiver 1 includes an optical transmitter 2, an optical receiver 6, a light source controller 510, and a digital signal processor (DSP) 50. In this example, the DSP 50 is used commonly for the optical transmitter 2 and the optical receiver 6.

The optical transmitter 2 has a wavelength tunable light source 10, an optical modulator 3, and a driver 4 that drives the optical modulator 3. Under the control of the light source controller 510, the resonance frequency of the resonator filter 14 (see FIG. 4) is adjusted in accordance with the wavelength set in the wavelength tunable light source 10. A light beam emitted at a predetermined wavelength from the wavelength tunable light source 10 is input to the optical modulator 3. Drive signals generated by the driver 4 based upon data signals are supplied to the optical modulator 3 to modulate the light input from the wavelength tunable light source 10. The modulated light of the designated wavelength is output as a light signal from the optical modulator 3.

The light source controller 510 may be a programmable logic device arranged in the optical transmitter 2, or it may be mounted together with the wavelength tunable light source 10 on the same substrate or chip.

The DSP 50 generates data signals to be input to the driver 4 of the optical transmitter 2. On the receiving side, the DSP 50 converts the electrical signals output from the optical receiver 6 into digital signals and restores the data signals.

With the configuration of the embodiment, stable wavelength monitoring is realized with less optical loss in the wavelength tunable light source. The structure and process illustrated in the above-described embodiment are examples of the invention, and various modifications and alterations are possible. The ratio using the photocurrents from the three photo detectors (PDs) is not limited to those described in the above examples, and any combinations can be made as long as the transmission spectrum of the wavelength filter 150 is acquired. For example, ratios such as P1/(P2+P3), P2/(P1+P3), P3/(P1+P2) and so on may also be used to monitor and control the wavelength.

The light source 20 is not limited to an external resonator type, and it may be a monolithic laser diode with a diffraction grating for selecting a wavelength. The delay waveguide (optical waveguide 153) of the wavelength filter 150 may be patterned into an appropriate path such as a U-shaped curve, a W-shaped curve, or hairpin curves. The 90-degree optical hybrid for the optical mixer 154 may be formed by an appropriate multimode interference (MMI) coupler or a combination of two or more MMI waveguides. Although in the example of FIG. 4, the resonator filter 14, the wavelength filter 150, and the optical waveguides 131, 132 and 133 are formed monolithically over the SOI substrate, they may be formed over a compound semiconductor substrate such as an InP substrate.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. A wavelength tunable light source comprising:
   a light source,
   a wavelength monitor circuit configured to receive light emitted from the light source, and
   a processor that controls the light source based upon an output value of the wavelength monitor circuit,
   wherein the wavelength monitor circuit has a wavelength filter with a periodic transmission spectrum, and three photo detectors connected to outputs of the wavelength filter, and
   wherein the processor is configured to calculate a ratio of photo-detection normalized with two of three quantities of light received at the three photo detectors and control electric current input to the light source such that a calculated ratio of photo-detection approaches a target ratio at a designated wavelength.

2. The wavelength tunable light source as claimed in claim 1, wherein when calculating the ratio, the processor is configured to use a sum of two quantities of received light among the three quantities of the light received at the three photo detectors as a denominator, and one quantity of received light out of the three quantities as a numerator.

3. The wavelength tunable light source as claimed in claim 1, further comprising:
   a memory configured to store characteristic information of the wavelength filter, the characteristic information being represented as three types of ratios calculated in advance based upon outputs of the three photo detectors,
   wherein the processor is configured to select a ratio with a greatest rate of change in photocurrent or electric voltage at the designated wavelength from the characteristic information of the wavelength filter, and calculates the ratio of photo-detection.

4. The wavelength tunable light source as claimed in claim 3,
   wherein the memory is configured to store the characteristic information of the wavelength filter in a form of transmission spectra of the wavelength filter for the three types of ratios.

5. The wavelength tunable light source as claimed in claim 3,
   wherein the memory is configured to store the characteristic information of the wavelength filter in a form of a table in which a type of ratio and a target ratio are associated with each of wavelengths.

6. The wavelength tunable light source as claimed in claim 1,
   wherein the wavelength filter has an optical splitter that splits an input light into two portions and outputs split light to two optical waveguides with different length, and an optical mixer that makes light propagating through the two optical waveguides interfere with each other and output four light components with phase shifted by 90 degrees from each other, and
   wherein the three photo detectors are connected to three of four outputs of the optical mixer.

7. The wavelength tunable light source as claimed in claim 1,
   wherein the light source is of an external resonator type, and the processor is configured to control the electric current input to the external resonator such that the calculated ratio of photo-detection approaches the target ratio at the designated wavelength.

8. An optical transceiver comprising:

an optical transmitter with a wavelength tunable light source as claimed in claim 1; and an optical receiver.

\* \* \* \* \*